UNITED STATES PATENT OFFICE.

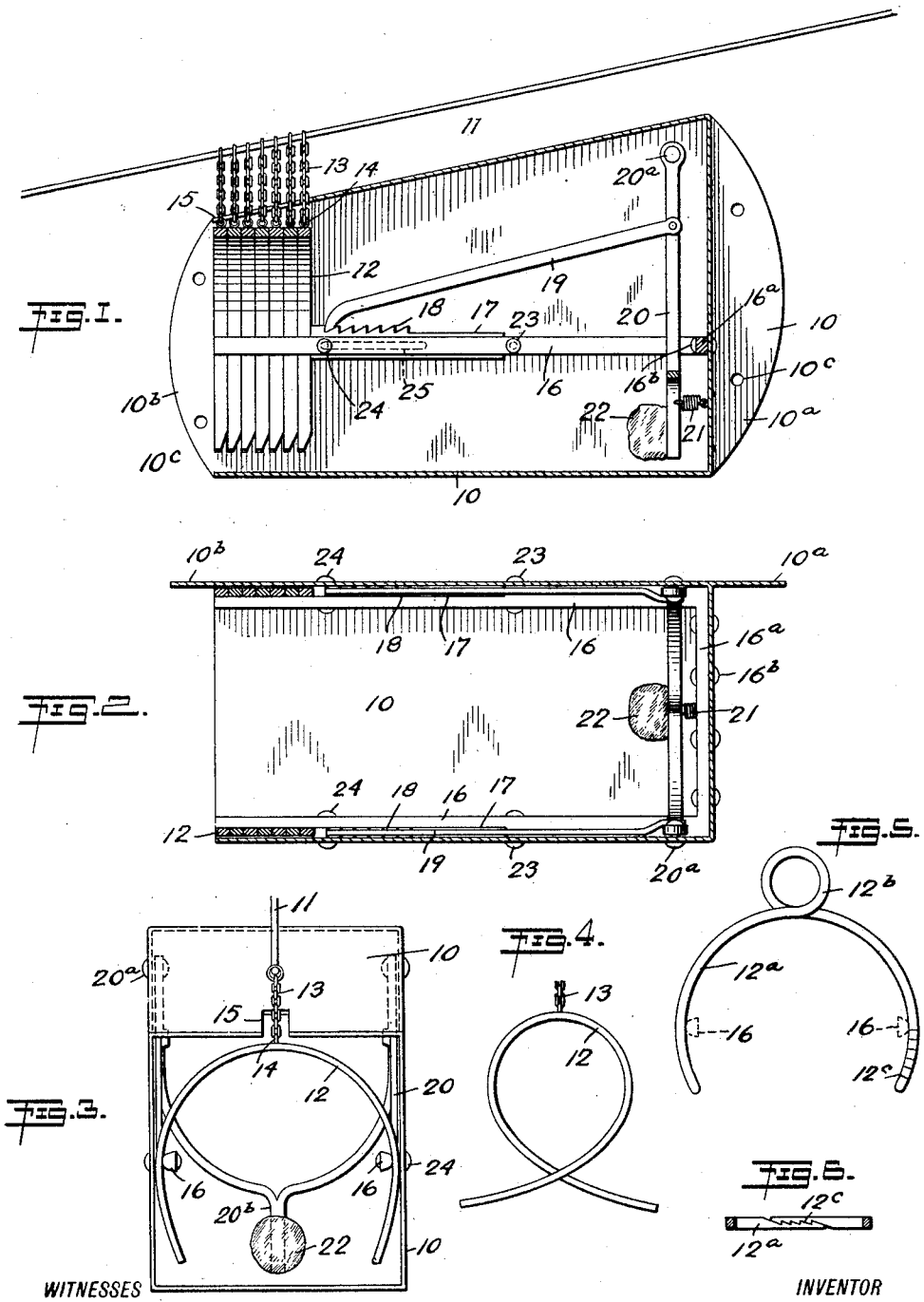

CASSIUS M. C. KIRK, OF SOUTH FORT GEORGE, BRITISH COLUMBIA, CANADA.

ANIMAL-TRAP.

1,107,218.  Specification of Letters Patent.  Patented Aug. 11, 1914.

Application filed January 6, 1914. Serial No. 810,642.

*To all whom it may concern:*

Be it known that I, CASSIUS M. C. KIRK, a citizen of the United States, and a resident of South Fort George, in the Province of British Columbia, Canada, have invented a new and Improved Animal-Trap, of which the following is a full, clear, and exact description.

My invention relates particularly to an animal trap having means to support a resilient clasp, and means whereby the clasp will be automatically released by the animal, to grip the animal.

In the preferred form of the invention a series of resilient clasps are slidably suspended on a rod; a retainer holds the clasps in the open position, and a step-by-step release means is controlled by movements of a bait holder.

The invention consists in the novel features hereinafter more particularly described and defined in the claims.

Reference is to be had to the accompanying drawings forming a part of this specification, in which similar characters of reference indicate corresponding parts in all the views.

Figure 1 is a longitudinal vertical section of a trap embodying my invention; Fig. 2 is a horizontal section; Fig. 3 is a front view; Fig. 4 is a separate view of one of the clasps in the closed position; Fig. 5 is a front view of one of the clasps slightly modified, showing the same open; and Fig. 6 is a cross section of the clasp shown in Fig. 5, illustrating the same in a closed position.

In constructing a practical embodiment of the invention as illustrated, a suitable casing or body 10 is provided, which may be formed with flanges $10^a$, $10^b$, having holes $10^c$, whereby to secure the device to a tree or other support. A rod or wire 11 is supported in any suitable manner above the trap, and preferably inclined downwardly in a direction toward the front end of the trap. On the wire 11 a clasp or clasps 12 are suspended, there being seven of the same indicated. Chains 13 strung on the wire are shown as secured by eyes 14 to the respective clasps. Said clasps are open at the bottom, being in the form of a resilient curved bar, and the resiliency tends to close the clasps so that their ends overlap, as indicated in Fig. 4. The several chains may extend through a slot 15 in the top of the trap. In any event the clasps will be supported in the vertical position with the sides of the clasp adjacent to the side walls of the body 10, at the interior of the latter.

To retain the clasps in the open position, retaining arms 16 are provided, extending longitudinally at each side of the trap along the respective side arms of the clasps. Said bars 16 may be integral with each other and be joined by a transverse bar $16^a$ suitably secured as by rivets $16^b$ to the back of the body 10. A step-by-step release means is provided to successively release the respective clasps. The release means consists of push bars 17, disposed respectively along the sides of the body 10, between the same and the retaining bar 16, so that the forward ends of said push bars will engage the rearmost clasp 12. Ratchet teeth 18 are formed on the push bars 17, and said teeth are adapted to be engaged in succession from the front to the back of the push bars, by pawls 19.

The rear end of each pawl 19 is pivoted to a bait holder 20 of general U-form, the upper ends of which are pivoted, as at $20^a$, to the sides of the body 10, and at the lower end said bait holder has a bait-carrying member $20^b$, to which any suitable bait 22 may be secured by tying, or otherwise. A retractile spring 21 is connected with the bait-holder 20 and with the adjacent wall of the body 10, tending to return the bait holder to the normal position, and offering a resistance to a pull thereon by an animal attacking the bait 22. The push bar 17 is afforded guided movement on the body 10 by any suitable means, here shown as a slot and pin connection; thus side rivets 23, 24, or the like, secure each retaining arm 16 to the case and the forward rivets 24 extend through longitudinal slots 25 in the push bars 17.

By the described construction a forward movement of the bait holder 20 in response to a pull by the animal, will cause the pawls 19 to exert a forward push on the bars 17, and the latter will in turn exert a forward push on the clasps 12, so that the front clasp will be released from the retaining arms 16 and be permitted to assume the closed position shown in Fig. 4, whereby to grip the animal. At the same time the retractile spring 21 acting on the bait holder 20, will cause the pawls 19 to drop behind the next rearmost tooth 18. The same operation will be repeated by successive animals attacking the bait. The struggles of each animal gripped will cause the released clasp to be drawn downwardly on the rod 11 away from the front of the trap.

In the form shown in Fig. 4, the side arms presented by the clasp are plain, so that the resiliency of the clasp is relied upon to prevent its expansion and release by the animal.

In the form shown in Figs. 5 and 6, however, the clasp $12^a$ may, in addition to its inherent resiliency, have a spring loop $12^b$ from which the clasp arms emanate. Said clasp arms are formed adjacent to their free ends with reverse mating ratchet teeth $12^c$, which will engage each other when the clasp is permitted to close, whereby the clasp will be locked in the closed position.

Having thus described my invention, I claim as new, and desire to secure by Letters Patent:

1. In an animal trap, a resilient clasp to grip the animal, a support on which the clasp is slidable, a retainer for the clasp to maintain it in open position, a pusher device to release the clasp from the retainer, a feed means to actuate the pusher device, and a bait holder operatively connected with the feed means.

2. In an animal trap, a plurality of resilient clasps to grip the animal, a retainer to maintain the clasp in the open position, a step-by-step releasing means for the clasps, a bait holder, and operative connections between the bait holder and the step-by-step releasing means.

3. In an animal trap, a series of resilient gripping clasps, a rod from which the clasps are suspended and on which they may slide, a retaining means to hold the clasps open, a reciprocating pusher movable to release the clasps in succession from the retaining means, said pusher having ratchet teeth, a pawl engageable with successive ratchet teeth, and a spring-pressed pivoted bait holder connected with said pawl.

4. In an animal trap, a resilient clasp adapted to grip the animal, the clasp presenting side arms having mating ratchet teeth, means for supporting the clasp, a movable bait holder, a retaining means for the clasp, and means operated by the bait holder to release the clasp from the retaining means.

In testimony whereof I have signed my name to this specification in the presence of two subscribing witnesses.

CASSIUS M. C. KIRK.

Witnesses:
M. LEO SULLIVAN,
M. C. WIGGINS.

Copies of this patent may be obtained for five cents each, by addressing the "Commissioner of Patents, Washington, D. C."